(12) United States Patent
Fukamizu et al.

(10) Patent No.: US 9,514,898 B2
(45) Date of Patent: Dec. 6, 2016

(54) SWITCH DEVICE FOR SUNROOF

(71) Applicants: Takahiro Fukamizu, Kariya (JP); Hideki Fuchigami, Kariya (JP); Takeshi Iwai, Nisshin (JP); Shohei Kobata, Chiryu (JP)

(72) Inventors: Takahiro Fukamizu, Kariya (JP); Hideki Fuchigami, Kariya (JP); Takeshi Iwai, Nisshin (JP); Shohei Kobata, Chiryu (JP)

(73) Assignees: Toyota Shatai Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 205 days.

(21) Appl. No.: 14/377,416

(22) PCT Filed: Oct. 19, 2012

(86) PCT No.: PCT/JP2012/077072
§ 371 (c)(1),
(2) Date: Aug. 7, 2014

(87) PCT Pub. No.: WO2013/128704
PCT Pub. Date: Sep. 6, 2013

(65) Prior Publication Data
US 2015/0014138 A1    Jan. 15, 2015

(30) Foreign Application Priority Data
Feb. 28, 2012    (JP) .................... 2012-041838

(51) Int. Cl.
H01H 9/00 (2006.01)
H01H 9/26 (2006.01)
(Continued)

(52) U.S. Cl.
CPC ............... *H01H 9/26* (2013.01); *B60J 7/043* (2013.01); *H01H 15/06* (2013.01); *B60J 7/0573* (2013.01);
(Continued)

(58) Field of Classification Search
None
See application file for complete search history.

(56) References Cited

U.S. PATENT DOCUMENTS 5,436,413 A    7/1995  Katakami
6,409,261 B1   6/2002  Lindinger et al.
(Continued)

FOREIGN PATENT DOCUMENTS

DE    102005045300 A1    9/2006
FR    1226479            7/1960
(Continued)

OTHER PUBLICATIONS

IPRP for International Application No. PCT/JP2012/077072 issued Sep. 2, 2014.
(Continued)

*Primary Examiner* — R S Luebke
*Assistant Examiner* — Ahmed Saeed
(74) *Attorney, Agent, or Firm* — Patterson Thuente Pedersen, P.A.

(57) ABSTRACT

A switch device for a sunroof includes: a glass switch piece, which is switchable between glass opening positions and a glass closing position, which are for selecting whether to open or close the opening of a sunroof with a roof glass; and a shade switch piece, which is switchable between a shade opening position and a shade closing shade positions, which are for selecting whether to open or close the opening with of a roof shade. The shade closing positions include a first closing position and a second closing position. The switch
(Continued)

device is provided with an interlocking portion, which links the glass switch piece to the shade switch piece so that the glass switch piece is moved into the glass closing position when the shade switch piece is moved to the second closed position.

6 Claims, 6 Drawing Sheets

(51) Int. Cl.
*H01H 15/06* (2006.01)
*B60J 7/043* (2006.01)
*B60J 7/057* (2006.01)
*H01H 15/02* (2006.01)
*H01H 19/14* (2006.01)
*H01H 19/50* (2006.01)

(52) U.S. Cl.
CPC ............ *H01H 15/025* (2013.01); *H01H 19/50* (2013.01); *H01H 2019/143* (2013.01); *H01H 2221/052* (2013.01); *H01H 2221/08* (2013.01); *H01H 2221/088* (2013.01); *H01H 2300/006* (2013.01); *H01H 2300/01* (2013.01)

(56) References Cited

U.S. PATENT DOCUMENTS

| | | | |
|---|---|---|---|
| 6,572,184 B2 | 6/2003 | Bauer et al. | |
| 6,981,739 B2 | 1/2006 | Plettenberg | |
| 7,281,758 B2 | 10/2007 | Fuchs et al. | |
| 2006/0066141 A1* | 3/2006 | Fuchs | B60J 7/0015 296/223 |
| 2010/0219056 A1* | 9/2010 | An | H01H 25/002 200/337 |

FOREIGN PATENT DOCUMENTS

| | | |
|---|---|---|
| JP | 5-4521 A | 1/1993 |
| JP | H05-149054 A | 6/1993 |
| JP | H07-276993 A | 10/1995 |
| JP | 2011-11735 A | 1/2001 |
| JP | 4153821 B2 | 7/2008 |

OTHER PUBLICATIONS

Written Opinion for International Application No. PCT/JP2012/077072 dated Jan. 15, 2013.
Extended European Search Report for EP 12869832.1, mailed Dec. 21, 2015, 7 pages total.

* cited by examiner

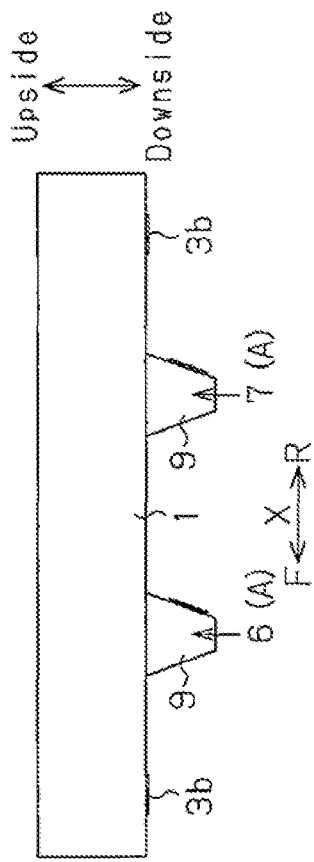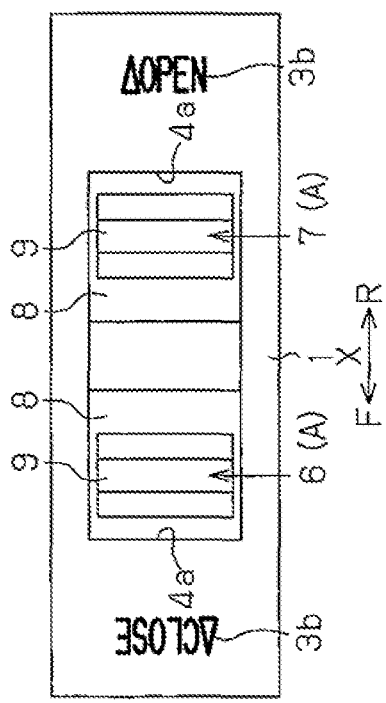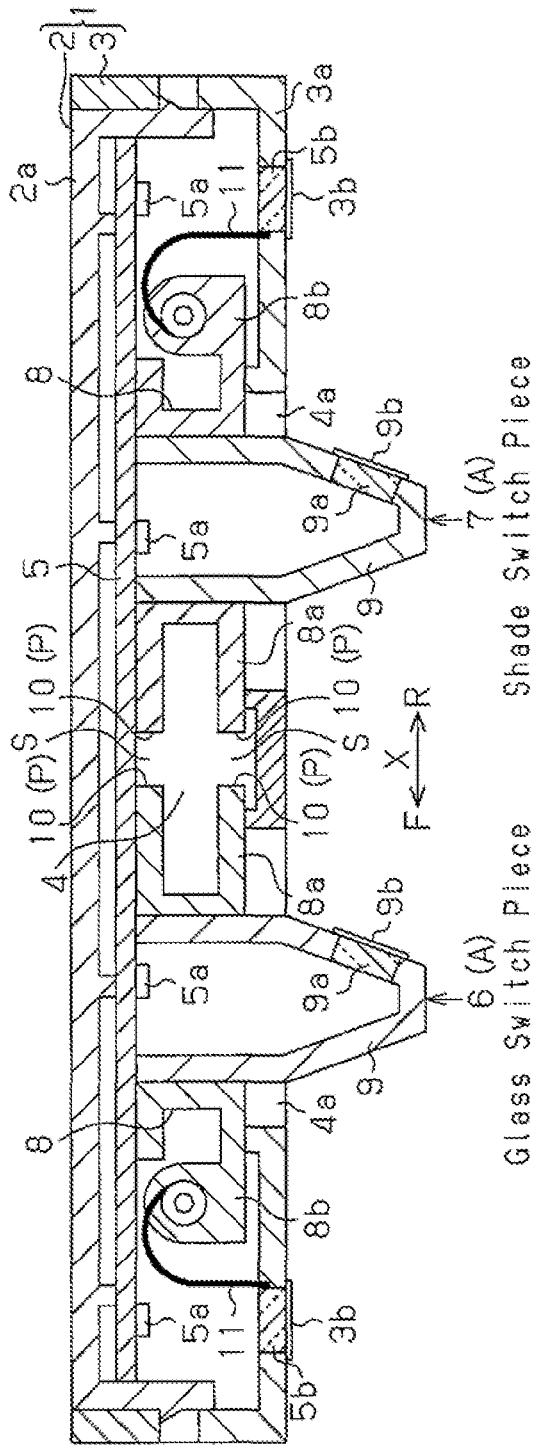

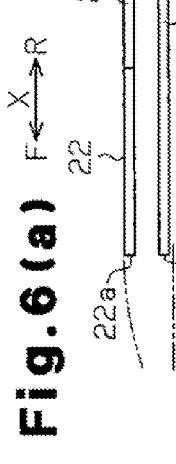
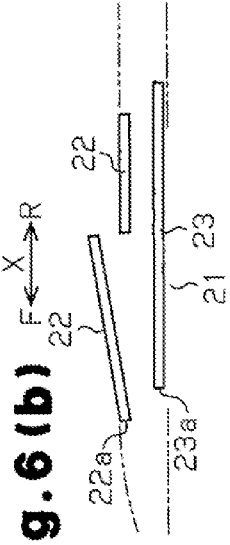
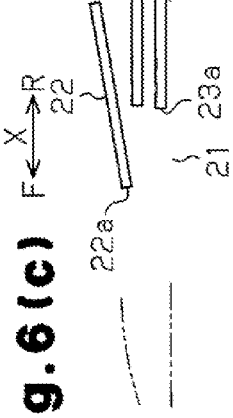
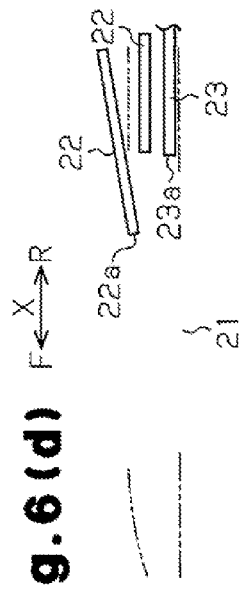
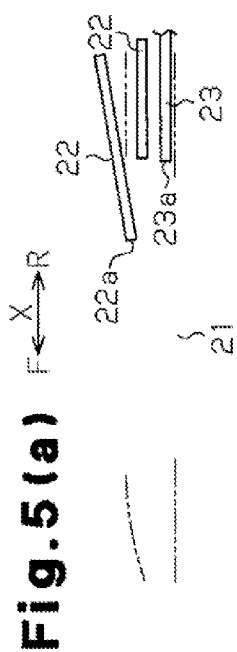
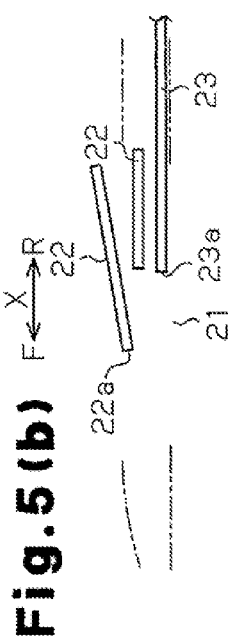
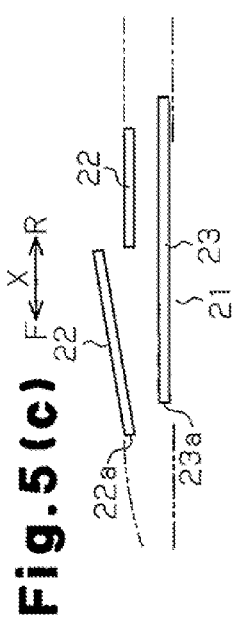
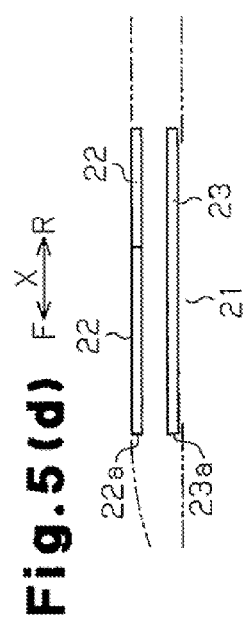

SWITCH DEVICE FOR SUNROOF

RELATED APPLICATIONS

The present application is a National Phase entry of PCT Application No. PCT/JP2012/077072, filed Oct. 19, 2012, which application claims priority to Japanese Application No. 2012-041838, filed Feb. 28, 2012, both of said applications being hereby incorporated by reference in their entirety.

BACKGROUND OF THE INVENTION

The present invention relates to a switch device including a glass switch piece manipulated to cause a roof glass to selectively open and close an opening formed in a sunroof of a vehicle and a shade switch piece manipulated to cause a roof shade to selectively open and close the opening.

Conventionally, a sunroof for a vehicle (Example 1) having a roof glass electrically slid to selectively open and close an opening and a roof shade manually slid to selectively open and close the opening is publicly known. Other types of such publicly known sunroofs include a sunroof for a vehicle (Example 2) configured by adding a tiltable roof glass to the sunroof for a vehicle of Example 1, a sunroof for a vehicle (Example 3) having a fixed roof glass and a roof shade electrically slid to selectively open and close an opening, and a sunroof for a vehicle (Example 4) having a roof glass and a roof shade both electrically slid to selectively open and close an opening.

In the sunroofs of Examples 1 and 3, one of the roof glass and the roof shade is manipulated through a single switch. Accordingly, erroneous manipulation is unlikely to happen when the roof glass or the roof shade is moved to selectively open and close the opening. In the sunroof of Example 2, two functions of a single component, which are sliding and tilting of the roof glass, are achieved through manipulation of two switches. However, since the two switches operate the single component, erroneous manipulations are limited.

In contrast, the sun roof of Example 4 employs separate switches to operate two components, which are the roof glass and the roof shade. This may cause complicated or erroneous switch manipulation. If the roof shade is closed with the roof glass left open, the open state of the roof glass cannot be visibly checked through the roof shade, and the roof glass is likely to be left open. This problem may be solved by, as has been proposed in certain techniques, forming the roof shade using mesh, for example, to allow the roof shade to maintain the roof glass visible through the roof shade when the roof glass is left open.

Japanese Laid-Open Patent Publication No. 2011-11735, Japanese Laid-Open Patent Publication No. 5-4521, and Japanese Patent No. 4153821 each describe the sunroof operating the roof glass and the roof shade through separate switches and controlling the roof glass simultaneously with the roof shade to close the opening when the roof shade is moved to close the opening.

However, in the techniques disclosed in these prior art documents, closing of the roof glass is electrically controlled to happen in a manner following closing of the roof shade. This may cause erroneous operation due to noise.

SUMMARY OF THE INVENTION

Accordingly, it is an objective of the present invention to reliably close a roof glass a roof shade is closed.

To achieve the foregoing objective, and in accordance with a first aspect of the present invention, a switch device for a sunroof is provided that includes a glass switch piece and a shade switch piece that are manipulated to selectively open and close an opening in the sunroof with a roof glass and a roof shade, respectively. The glass switch piece is switchable between a glass close position for closing the opening with the roof glass and a glass open position for opening the opening with the roof glass. The shade switch piece is switchable between a shade close position for closing the opening with the roof shade and a shade open position for opening the opening with the roof shade. The switch device includes an interlocking portion for causing the glass switch piece and the shade switch piece to operate in an interlocking manner. The shade close position of the shade switch piece includes a first close position, at which the interlocking portion prohibits the interlocking operation of the glass switch piece and the shade switch piece, and a second close position, at which the interlocking portion causes the glass switch piece and the shade switch piece to operate together in an interlocking manner. When the shade switch piece is moved to the first close position, the interlocking portion allows the shade switch piece to be independently manipulated and the roof shade closes the opening. When the shade switch piece is moved to the second close position, the interlocking portion causing the glass switch piece to be operated together with the shade switch piece in an interlocking manner, thereby moving the glass switch piece to the glass close position so that the opening is closed with the roof shade and the roof glass.

In this case, when the shade switch piece is switched to the second close position, the interlocking portion causes the glass switch piece to operate together with the shade switch piece and is moved to the glass close position. The opening is prevented from being closed only by the roof shade when the opening is opened by the roof glass. Thus, such a simple mechanical configuration prevents the roof glass from being left open and reliably closes the roof glass when the roof shade is closed.

The glass close position of the glass switch piece may include a first open position, at which the interlocking portion prohibits the interlocking operation of the glass switch piece and the shade switch piece, and a second open position, at which the interlocking portion causes the glass switch piece and the shade switch piece to operate together in an interlocking manner. When the glass switch piece is moved to the first open position, the interlocking portion allows the glass switch piece to be operated independently and the roof glass opens the opening. When the glass switch piece is moved to the second open position, the interlocking portion causes the shade switch piece to operate together with the glass switch piece in an interlocking manner to move the shade switch piece to the shade open position, so that the opening is opened with the roof glass and the roof shade.

In this case, when the glass switch piece is switched to the second open position, the interlocking portion causes the shade switch piece to operate together with the glass switch piece and is moved to the shade open position. Thus, when the opening is closed with the roof shade, the roof glass is prevented from being moved to open the opening with the roof shade keeping closing the opening. Thus, the simple mechanical configuration prevents the roof glass from being left open and improves the reliability of opening of the roof shade that accompanies opening of the roof glass.

The interlocking portion preferably includes a contact portion arranged in the glass switch piece and a contact portion arranged in the shade switch piece. The glass switch piece and the shade switch piece are switchable together in an interlocking manner when the contact portion of the glass switch piece and the contact portion of the shade switch piece contact each other. The glass switch piece and the shade switch piece are independently switchable when the contact portion of the glass switch piece and the contact portion of the shade switch piece are separated from each other.

In this case, the contact portion in the glass piece switch piece and the contact portion in the shade switch piece provide an auto-closing feature formed by a simple mechanical configuration.

The direction in which the glass switch piece is preferably switched to the glass close position and the direction in which the shade switch piece is switched to the shade close position coincide with the direction in which the roof glass and the roof shade are moved to close the opening. The direction in which the glass switch piece is preferably switched to the glass open position and the direction in which the shade switch piece is switched to the shade open position coincide with the direction in which the roof glass and the roof shade are moved to open the opening.

In this case, the user is allowed to selectively open and close the opening through the roof glass and/or the roof shade with the same feeling as when the user manipulates the glass switch piece and/or the shade switch piece. Erroneous switch manipulation is thus made unlikely to occur.

The glass switch piece and the shade switch piece are preferably switchable in a common manipulating direction, and the glass switch piece and the shade switch piece are preferably arranged in the manipulating direction.

In this case, the position of the glass switch piece and the position of the shade switch piece can be held simultaneously, thus facilitating manipulation of the switch pieces.

The glass switch piece and the shade switch piece are preferably both reciprocally movable in a linear manner.

In this case, the linear reciprocal movement of the glass switch piece and the shade switch piece facilitates manipulation of the switch pieces.

The glass switch piece and the shade switch piece are preferably each reciprocally pivotal.

In this case, the reciprocal pivoting motion of the glass switch piece and the shade switch piece facilitates manipulation of the switch pieces.

BRIEF DESCRIPTION OF THE DRAWINGS

FIG. 1(a) is a bottom view showing a switch device according to a first embodiment of the present invention;

FIG. 1(b) is a side view showing the switch device;

FIG. 1(c) is a cross-sectional side view showing the switch device;

FIGS. 5(a), 5(b), 5(c), and 5(d) are views each illustrating an example of operation of the sun roof for closing an opening;

FIGS. 6(a), 6(b), 6(c), and 6(d) are views each illustrating an example of operation of the sun roof for opening the opening;

DETAILED DESCRIPTION

Figure 2A:
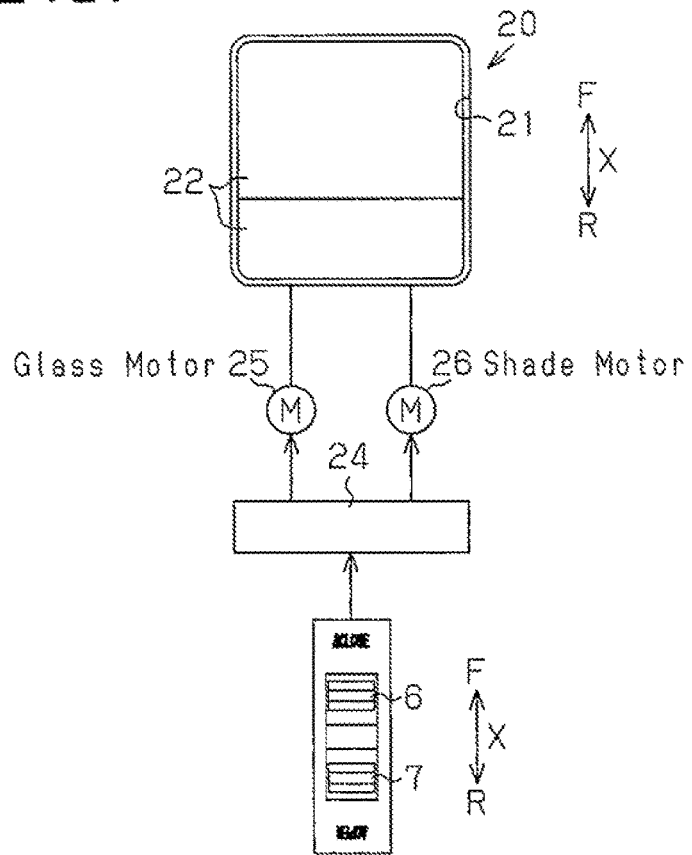
FIG. 2(a) is a plan view showing a portion of a sunroof.

A switch device for a sunroof of a vehicle according to a first embodiment of the present invention will now be described with reference to FIGS. 1 to 6.

As illustrated in FIGS. 1(a), 1(b), and 1(c), an attachment case 1 is attached to the lower surface of the roof of a vehicle. The attachment case 1 is configured by an upper case portion 2 and a lower case portion 3, which are joined together. An accommodation chamber 4 is formed in the attachment case 1. A base plate 5 is secured to an inner side of an upper board 2a of the upper case portion 2 in the accommodation chamber 4. A pair of openings 4a is formed in a lower board 3a of the lower case portion 3 and spaced apart in the extending direction X of the attachment case 1. The openings 4a both communicate with the accommodation chamber 4. A glass switch piece 6 and a shade switch piece 7 are mounted in the attachment case 1 and spaced apart in the extending direction X of the attachment case 1. The glass switch piece 6 and the shade switch piece 7 each include a slider 8, which is arranged between the base plate 5 and the lower board 3a in the accommodation chamber 4, and a knob 9, which is attached to the slider 8 and projected downward through the corresponding opening 4a. The knobs 9 and sliders 8 are linearly movable toward or away from the corresponding knobs 9 and sliders 8 in the extending direction X of the attachment case 1. In other words, the glass switch piece 6 and the shade switch piece 7 are manipulated in a common manipulating direction, which is the extending direction X of the attachment case 1. In the first embodiment, the extending direction X of the attachment case 1 coincides with the forward-rearward direction of the vehicle and the movement direction of a roof glass 22 and a roof shade 23 for selectively closing and opening an opening 21 of the sunroof. In FIGS. 1(a) to 1(c), "F" refers to "forward" and "R" refers to "rearward".

Each one of the sliders 8 has a first side portion 8a and a second side portion 8b, which are arranged at opposite sides of the corresponding one of the knobs 9. The first side portions 8a of the sliders 8 are located between the knobs 9 and spaced apart and opposed to each other in the extending direction X of the attachment case 1. Each first side portion 8a has contact portions 10 (engagement portions or interlocking portions), each of which is formed in a corresponding end portion of the first side portion 8a. The second side portion 8b of each slider 8 is connected to a return spring 11 attached to the lower board 3a.

Figure 2B:
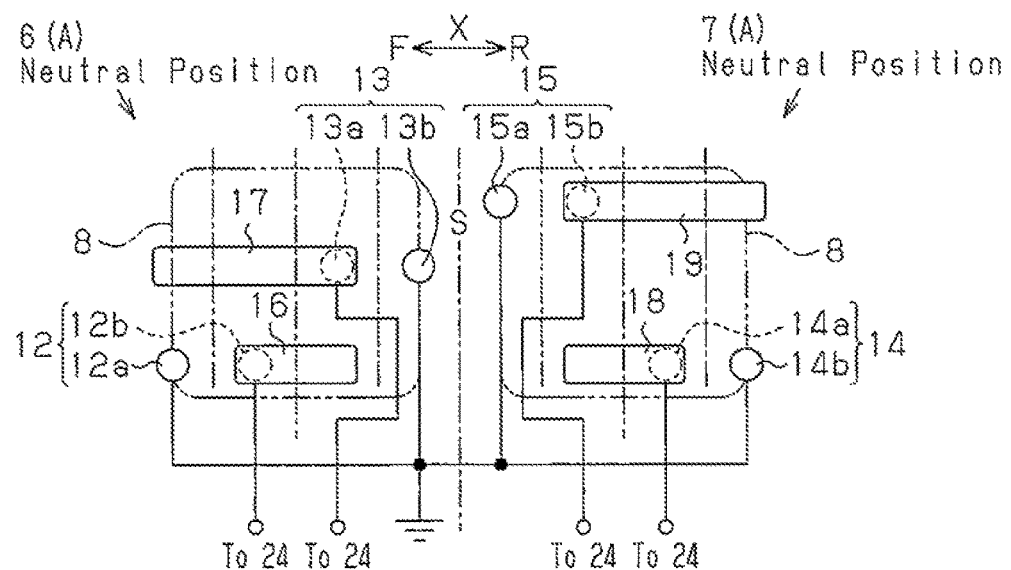
FIG. 2(b) is a circuit diagram representing a neutral state of the switch device.

With reference to FIG. 2(b), connecting portions 12 and 13 are mounted on the base plate 5 at positions corresponding to the glass switch piece 6. The connecting portion 12 includes a pair of fixed contact points (hereinafter, simply referred to as contact points) 12a and 12b, which are spaced apart in the extending direction X of the attachment case 1. The connecting portion 13 includes a pair of contact points 13a and 13b, which are spaced apart in the extending direction X of the attachment case 1. A connecting portion 14 and a connecting portion 15 are secured to the base plate 5 at positions corresponding to the shade switch piece 7. The connecting portion 14 has a pair of contact points 14a and 14b, which are spaced apart in the extending direction X of the attachment case 1. The connecting portion 15 includes a pair of contact points 15a and 15b, which are spaced apart in the extending direction X of the attachment case 1. The contact points 12a, 12b, 13a, 13b, 14a, 14b, 15a, and 15b are connected to a controller 24.

Movable contact points 16 and 17, which are connectable to the connecting portions 12 and 13, respectively, are attached to the slider 8 of the glass switch piece 6. Movable contact points 18 and 19, which are connectable to the connecting portions 14 and 15, respectively, are attached to the slider 8 of the shade switch piece 7.

A plurality of illuminating portions 5a is attached to the base plate 5 at positions corresponding to the glass switch piece 6 and the shade switch piece 7. The illuminating portions 5a illuminate display portions 3b, which are secured to an outer side of the lower board 3a, and the interiors of the knobs 9. Windows are formed in the lower board 3a and the knobs 9 at positions facing the illuminating portions 5a. Transparent or translucent window members 5b, 9a are embedded in the windows. The display portions 3b are layered with and fixed to the corresponding window members 5b. Display portions 9b are layered with and fixed to the corresponding window members 9a. Each of the illuminating portions 5a is formed by a light emitting diode and capable of illuminating the corresponding one of the display portions 3b, 9b from the interior of the attachment case 1 through the associated window member 5b, 9a.

The characters "close" are engraved in each of the front ones of the display portions 3b and the characters "open" are engraved in each of the rear ones of the display portions 3b. Since the engraved portion representing the characters has decreased thickness compared with the thickness of the non-engraved portion, the characters emerge in light when the illuminating portions 5a illuminate the display portions 3b. The characters "roof switch" are engraved in the display portion 9b of the glass switch piece 6 and the characters "shade" are engraved in the display portion 9b of the shade switch piece 7. The characters emerge in light when the illuminating portions 5a illuminate the display portions 9b.

In FIGS. 1(a), 1(b), and 1(c), the glass switch piece 6 and the shade switch piece 7 are each arranged at a neutral position A and held at the neutral position A by elastic force applied by the return spring 11 to the corresponding slider 8. In this state, the contact portions 10 of the sliders 8 are spaced from the corresponding contact portions 10 to ensure a clearance S between each facing pair of the contact portions 10. That is, the glass switch piece 6 and the shade switch piece 7 are each arranged in an independently manipulable state P, in which the glass switch piece 6 and the shade switch piece 7 are manipulable independently from each other. When the glass switch piece 6 and the shade switch piece 7 are located at the respective neutral positions A, the movable contact points 16, 17, 18, 19, which are mounted in the sliders 8, maintain the corresponding connecting portions 12, 13, 14, 15, which are formed in the base plate 5, each in an open state, as illustrated in FIG. 2(b).

Figure 3A:
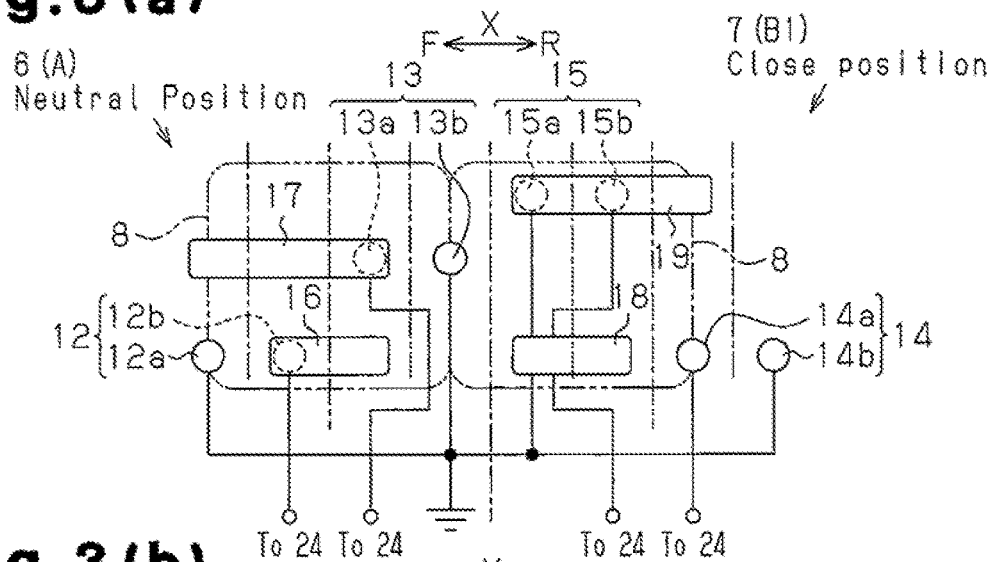
FIGS. 3(a), 3(b), and 3(c) are circuit diagrams each representing an example of a manipulated state of a shade switch piece of the switch device.
Figure 3B:
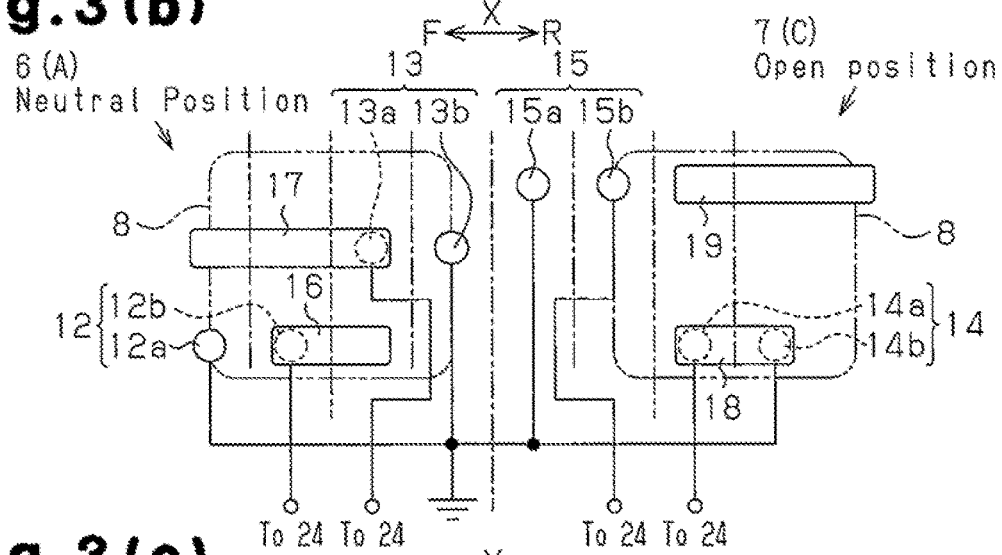
Figure 3C:
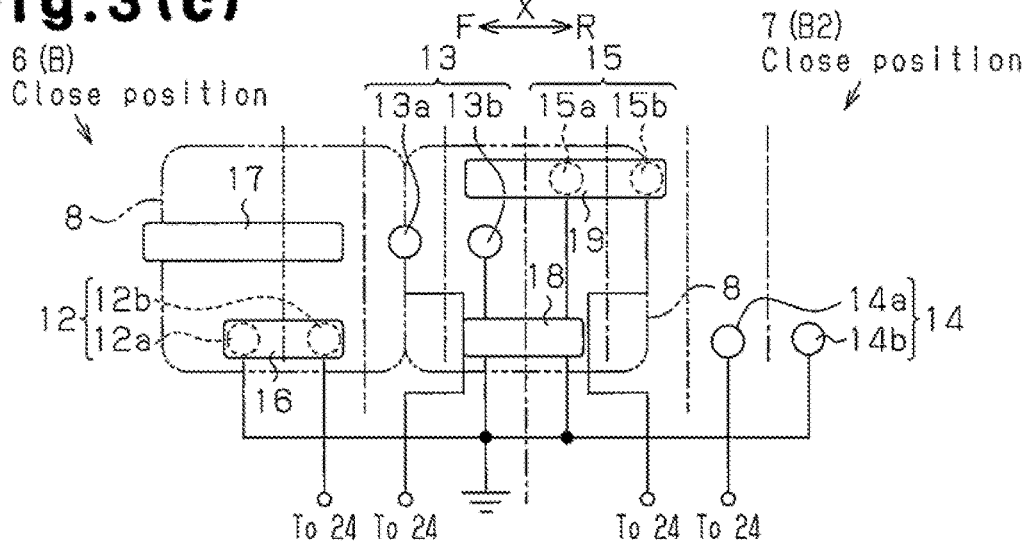

When the shade switch piece 7 is at the neutral position A and the knob 9 of the shade switch piece 7 is moved forward by a distance smaller than the clearance S between the facing contact portions 10 against the elastic force produced by the return spring 11, the shade switch piece 7 is moved to a first close position B1, which is a first-stage shade close position, in the independently manipulable state P, as illustrated in FIG. 3(a). When the shade switch piece 7 is held at the first close position B1, the movable contact point 18 secured to the slider 8 of the shade switch piece 7 maintains the connecting portion 14 mounted in the base plate 5 in the open state. In this state, the movable contact point 19, which is mounted in the slider 8 of the shade switch piece 7, arranges the connecting portion 15, which is attached to the base plate 5, in a closed state. In other words, the movable contact point 19 connects the contact point 15a to the contact point 15b in the connecting portion 15. When the shade switch piece 7 is at the neutral position A and the knob 9 of the shade switch piece 7 is moved rearward by a distance smaller than the clearance S between the facing contact portions 10 against the elastic force produced by the return spring 11, the shade switch piece 7 is moved to a shade open position C in the independently manipulable state P, as illustrated in FIG. 3(b). When the shade switch piece 7 is held at the shade open position C, the movable contact point 19 attached to the slider 8 of the shade switch piece 7 maintains the connecting portion 15 mounted in the base plate 5 in the open state. In this state, the movable contact point 18, which is mounted in the slider 8 of the shade switch piece 7, arranges the connecting portion 14, which is attached to the base plate 5, in a closed state. In other words, the movable contact point 18 connects the contact point 14a to the contact point 14b in the connecting portion 14. When the knob 9 of the shade switch piece 7 is continuously moved forward beyond the first close position B1 of the shade switch piece 7 against the elastic force of the return spring 11, the shade switch piece 7 is moved to a second close position B2, which is a second-stage shade close position, as illustrated in FIG. 3(c). At this stage, the contact portions 10 of the slider 8 of the shade switch piece 7 contact the corresponding contact portions 10 of the slider 8 of the glass switch piece 6 to move the slider 8 of the glass switch piece 6 such that the glass switch piece 6 is moved to a glass close position B. In other words, in this state, the shade switch piece 7 and the glass switch piece 6 are in an interlocking state, in which the shade switch piece 7 and the glass switch piece 6 are movable together with each other. When the shade switch piece 7 is held at the second close position B2, the movable contact point 18 secured to the slider 8 of the shade switch piece 7 maintains the connecting portion 14 attached to the base plate 5 in the open state. In this state, the movable contact point 19, which is mounted in the slider 8 of the shade switch piece 7, arranges the connecting portion 15, which is attached to the base plate 5, in a closed state. In other words, the movable contact point 19 connects the contact point 15a to the contact point 15b in the connecting portion 15. Meanwhile, the movable contact point 17 secured to the slider 8 of the glass switch piece 6 maintains the connecting portion 13 attached to the base plate 5 in the open state. In this state, the movable contact point 16, which is mounted in the slider 8 of the glass switch piece 6, arranges the connecting portion 12, which is attached to the base plate 5, in a closed state. In other words, the movable contact point 16 connects the contact point 12a to the contact point 12b in the connecting portion 12.

Figure 4A:
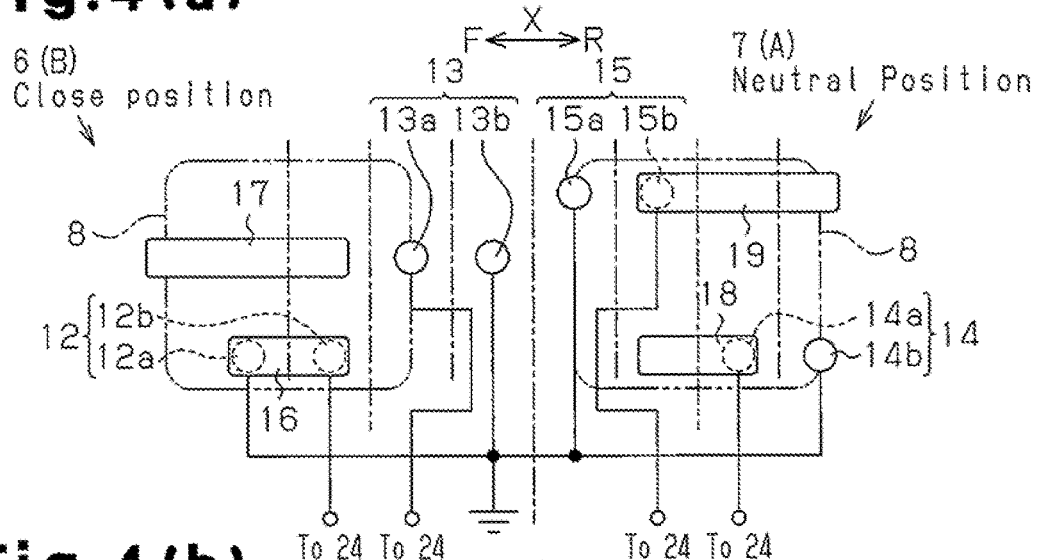
FIGS. 4(a), 4(b), and 4(c) are circuit diagrams each representing an example of a manipulated state of a glass switch piece of the switch device.
Figure 4B:
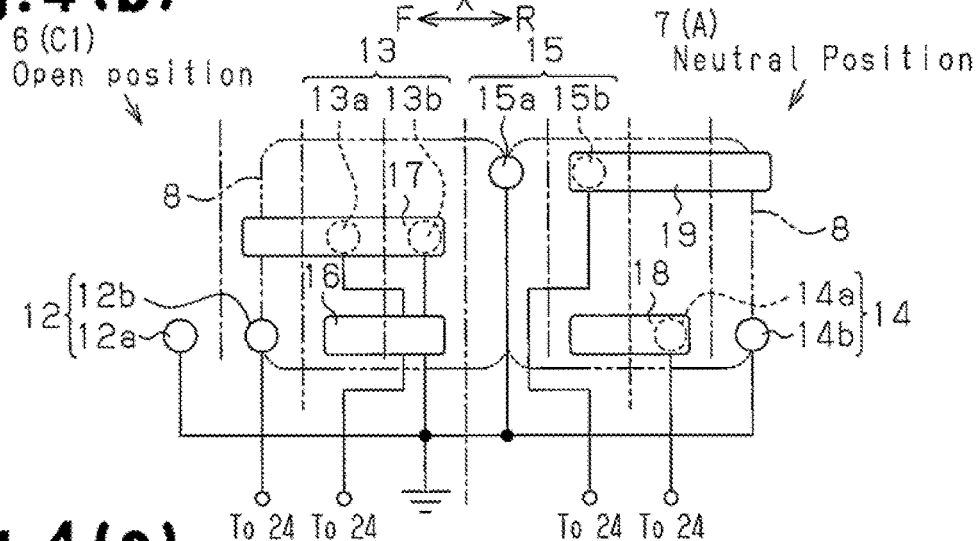
Figure 4C:
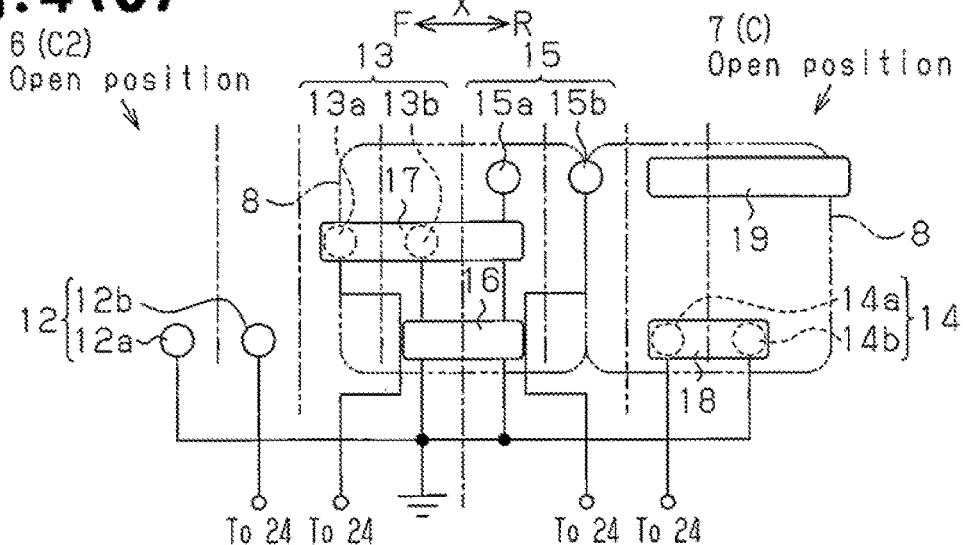

When the glass switch piece 6 is at the neutral position A and the knob 9 of the glass switch piece 6 is moved forward by a distance smaller than the clearance S between the facing contact portions 10 against the elastic force produced by the return spring 11, the glass switch piece 6 is moved to the glass close position B in the independently manipulable state P, as illustrated in FIG. 4(a). When the glass switch piece 6 is held at the glass close position B, the movable contact point 17 secured to the slider 8 of the glass switch piece 6 maintains the connecting portion 13 attached to the base plate 5 in the open state. In this state, the movable contact point 16, which is mounted in the slider 8 of the glass switch piece 6, arranges the connecting portion 12, which is attached to the base plate 5, in a closed state. In other words, the movable contact point 16 connects the contact point 12a to the contact point 12b in the connecting portion 12. When the glass switch piece 6 is at the neutral position A and the knob 9 of the glass switch piece 6 is moved rearward by a distance smaller than the clearance S between the facing contact portions 10 against the elastic force produced by the return spring 11, the glass switch piece 6 is moved to a first open position C1, which is a first-stage glass open position, as illustrated in FIG. 4(*b*). When the glass switch piece 6 is held at the first open position C1, the movable contact point 16 attached to the slider 8 of the glass switch piece 6 maintains the connecting portion 12 mounted in the base plate 5 in the open state. In this state, the movable contact point 17, which is mounted in the slider 8 of the glass switch piece 6, arranges the connecting portion 13, which is attached to the base plate 5, in a closed state. In other words, the movable contact point 17 connects the contact point 13a to the contact point 13b in the connecting portion 13. When the knob 9 of the glass switch piece 6 is continuously moved rearward beyond the first open position C1 of the glass switch piece 6 against the elastic force of the return spring 11, the glass switch piece 6 is switched to a second open position C2, which is a second-stage glass open position, as illustrated in FIG. 4(*c*). When the glass switch piece 6 is held at the second open position C2, the movable contact point 16 secured to the slider 8 of the glass switch piece 6 maintains the connecting portion 12 attached to the base plate 5 in the open state. In this state, the movable contact point 17, which is mounted in the slider 8 of the glass switch piece 6, arranges the connecting portion 13, which is attached to the base plate 5, in a closed state. In other words, the movable contact point 17 connects the contact point 13a to the contact point 13b in the connecting portion 13. Meanwhile, the contact portions 10 of the slider 8 of the glass switch piece 6 contact the corresponding contact portions 10 of the slider 8 of the shade switch piece 7 to move the slider 8 of the shade switch piece 7 such that the shade switch piece 7 is switched to the shade open position C. In other words, at this stage, the glass switch piece 6 and the shade switch piece 7 are arranged in an interlocking state, in which the glass switch piece 6 and the shade switch piece 7 are movable together with each other. When the shade switch piece 7 is at the shade open position C, the movable contact point 19 secured to the slider 8 of the shade switch piece 7 maintains the connecting portion 15 attached to the base plate 5 in the open state. In this state, the movable contact point 18, which is mounted in the slider 8 of the shade switch piece 7, arranges the connecting portion 14, which is attached to the base plate 5, in a closed state. In other words, the movable contact point 18 connects the contact point 14a to the contact point 14b in the connecting portion 14.

Each slider 8 has a non-illustrated elastic engagement portion. The lower board 3a of the lower case portion 3 includes a plurality of non-illustrated projected/recessed engagement portions, which are aligned in the movement direction of the slider 8 (which is the extending direction of the attachment case 1). The respective projected/recessed engagement portions are arranged at the positions corresponding to the neutral position A, the shade open position C, the first close position B1, and the second close position B2 of the shade switch piece 7, as well as the neutral position A, the glass close position B, the first open position C1, and the second open position C2 of the glass switch piece 6. The elastic engagement portion of each slider 8 cooperates with the projected-recessed engagement portion of the lower board 3a to function as a regulation mechanism for stopping the shade switch piece 7 and the glass switch piece 6 each in a stepped manner. The regulation mechanism operates when the shade switch piece 7 is switched from the neutral position A to either the first close position B1 or the shade open position C and from the first close position B1 to the second close position B2. The regulation mechanism also operates when the glass switch piece 6 is switched from the neutral position A to either the glass close position B or the first open position C1 and from the first open position C1 to the second open position C2.

As illustrated in FIG. 2(*a*), the opening 21 is formed in the sunroof 20 and the roof glass 22 and the roof shade 23 are arranged in the opening 21. The roof glass 22 and the roof shade 23 both selectively open and close the opening 21, as illustrated in FIGS. 5 and 6. The roof glass 22 is formed by, for example, organic glass or inorganic glass. When the glass switch piece 6 of the above-described switch device is switched to a glass open position or a glass close position, the controller 24 controls a glass motor 25 to open or close the opening 21 with the roof glass 22. If the shade switch piece 7 of the switch device is switched to a shade open position or a shade close position, the controller 24 controls a shade motor 26 to open or close the opening 21 with the roof shade 23. A plurality of encoders detects rotation of the glass motor 25 and rotation of the shade motor 26 to output a detection signal. The position of the roof glass 22 and the position of the roof shade 23 are detected based on the signal provided by the encoder.

Operation for selectively opening and closing the opening 21 of the sunroof 20 will hereafter be described.

As shown in FIG. 5(*a*), the roof glass 22 and the roof shade 23 maintain the opening 21 in a fully open state. If, in this state, the shade switch piece 7 is moved from the neutral position A to the first close position B1, the controller 24 controls the shade motor 26 such that the roof shade 23 starts to close the opening 21, as illustrated in FIG. 5(*b*). The controller 24 calculates the position of a front end portion 23a of the roof shade 23 and the position of a front end portion 22a of the roof glass 22 based on the detection signal from the aforementioned encoders, thus determining the distance between the front end portions 23a and 22a. When the distance between the front end portions 23a and 22a becomes less than a set value, the controller 24 stops the shade motor 26. That is, the front end portion 23a of the roof shade 23 stops immediately before moving forward with respect to the front end portion 22a of the roof glass 22 through regulation control, except for when the roof glass 22 fully closes the opening 21. In this manner, the front end portion 23a of the roof shade 23 is arranged at a position rearward to the front end portion 22a of the roof glass 22 and a certain distance is maintained between the front end portions 23a and 22a.

When the shade switch piece 7 is moved to the second close position B2 (see FIG. 3(*c*)), the glass switch piece 6 interlocks with the shade switch piece 7 and moved to the glass close position B. This moves the roof shade 23 and the roof glass 22 together to close the opening 21. At this stage, the shade motor 26 and the glass motor 25 are subjected to the regulation control by the controller 24 such that the front end portion 23a of the roof shade 23 is located rearward to the front end portion 22a of the roof glass 22 and a certain distance is maintained between the front end portions 23a and 22a. When the controller 24 detects that the opening 21 is fully closed by the roof glass 22 based on the detection signal from the encoder for the glass motor 25, the controller 24 ends the aforementioned control for maintaining the certain distance between the front end portion 22a of the roof glass 22 and the front end portion 23a of the roof shade 23. Accordingly, the roof shade 23 is switched from the state illustrated in FIG. 5(c) to the state illustrated in FIG. 5(d) and fully closes the opening 21.

With reference to FIG. 6(a), the roof glass 22 and the roof shade 23 maintain the opening 21 in a fully closed state. If, in this state, the glass switch piece 6 is switched from the neutral position A to the first open position C1 (see FIG. 4(b)), the controller 24 controls the glass motor 25 such that the roof glass 22 becomes inclined and the roof shade 23 slightly opens the opening 21, as illustrated in FIG. 6(b). This allows ventilation of the passenger compartment of the vehicle. When the glass switch piece 6 is switched to the second open position C2 (see FIG. 4(c)), the shade switch piece 7 interlocks with the glass switch piece 6 and moved to the shade open position C. As a result, the roof shade 23 and the roof glass 22 move together to the transient state shown in FIG. 6(c) and then to a fully open state of the opening 21, which is illustrated in FIG. 6(d). During such movement of the roof shade 23 and the roof glass 22, the controller 24 controls operation of the glass switch piece 6 and operation of the shade motor 26 such that the front end portion 23a of the roof shade 23 is located rearward to the front end portion 22a of the roof glass 22 and a certain distance is maintained between the front end portions 23a and 22a.

By moving the shade switch piece 7 from the neutral position A to either the first close position B1 or the shade open position C, independent operation of the roof shade 23 is permitted. Also, by moving the glass switch piece 6 from the neutral position A to either the first open position C1 or the glass close position B, independent operation of the roof glass 22 is permitted. At these stages, if the roof shade 23 or the roof glass 22 stops, the shade switch piece 7 may be switched to the second close position B2 or the glass switch piece 6 may be switched to the second open position C to continuously move the roof shade 23 or the roof glass 22.

Figure 7A:
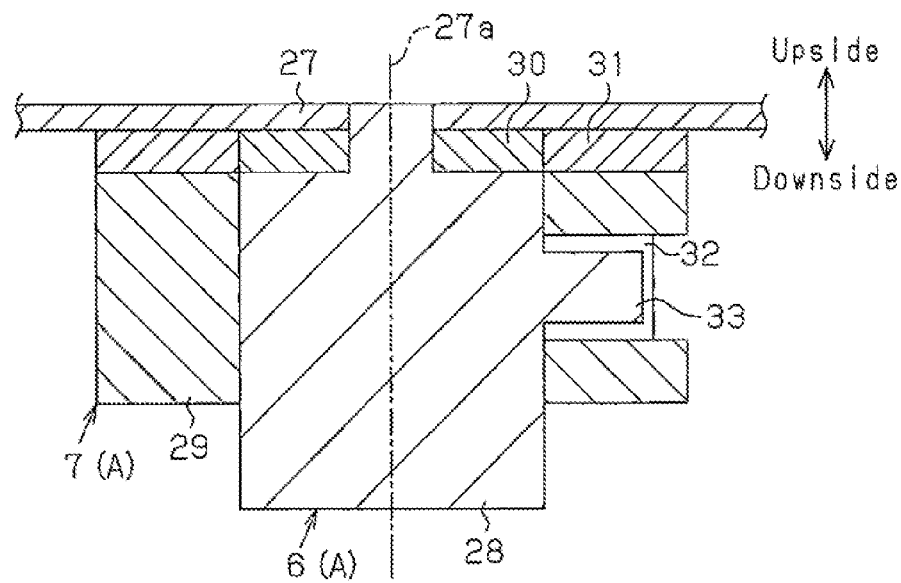
FIG. 7(a) is a cross-sectional side view showing a switch device according to a second embodiment of the invention.
Figure 7B:
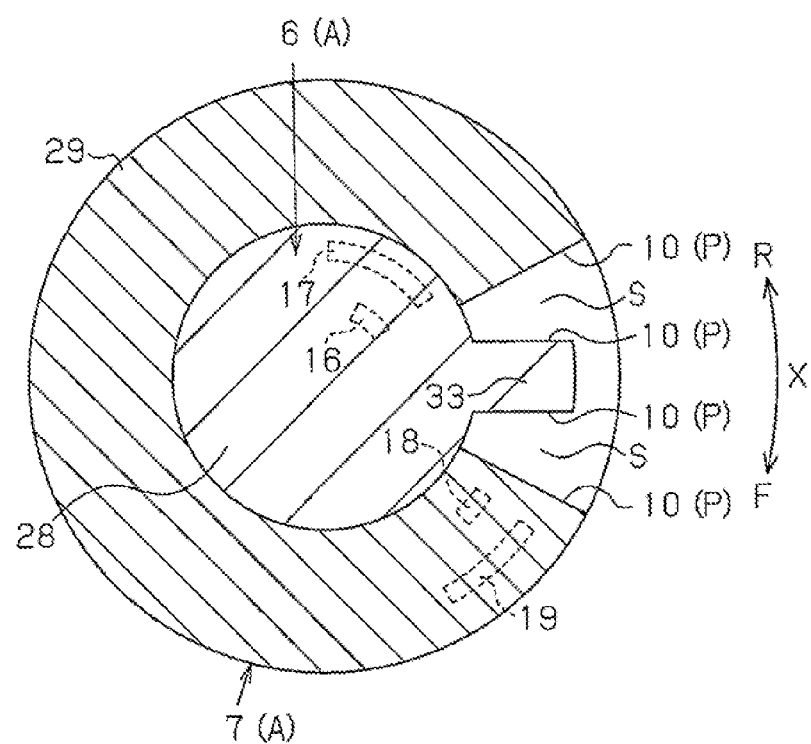
FIG. 7(b) is a cross-sectional bottom view showing the switch device of the second embodiment.

A second embodiment of the present invention will hereafter be described with reference to FIG. 7. The description below is focused on the difference between the second embodiment and the first embodiment.

In the first embodiment, the glass switch piece 6 and the shade switch piece 7 are aligned in the extending direction X of the attachment case 1. The glass switch piece 6 and the shade switch piece 7 are both reciprocally movable in a linear manner in the extending direction X of the attachment case 1. The extending direction X of the attachment case 1 coincides with the forward-rearward direction of the vehicle and the movement direction of the roof glass 22 and the roof shade 23 for selectively opening and closing the opening 21. In the second embodiment, the glass switch piece 6 has a knob 28, which is supported by a base plate 27 in a manner pivotal about a pivot axis 27a. A knob 29 of the shade switch piece 7 is supported at a radially outer position with respect to the knob 28 in a manner pivotal about the pivot axis 27a.

The knob 28 of the glass switch piece 6 has a slider 30, which faces the base plate 27. The knob 29 of the shade switch piece 7 includes a slider 31, which also faces the base plate 27. The slider 30 corresponds to the slider 8 of the glass switch piece 6 of the first embodiment. The slider 31 corresponds to the slider 8 of the shade switch piece 7 of the first embodiment. A cutout 32 is formed in a circumferential portion of the knob 29 of the shade switch piece 7. The knob 28 of the glass switch piece 6 has a projection 33, which is received in the cutout 32 of the knob 29. Contact portions 10 are formed on opposite circumferential sides of the projection 33 and opposite circumferential wall surfaces of the cutout 32. Each of the contact portions 10 of the projection 33 faces the corresponding one of the contact portions 10 of the cutout 32 by a clearance S between the facing contact portions 10. The contact portions 10 operate in the same manner as the contact portions 10 of the first embodiment. The slider 30 of the glass switch piece 6 has movable contact points 16, 17, which function in the same manner as the contact points 16, 17 of the first embodiment. The contact points 16, 17 are each formed in an arcuate shape and arranged adjacent to each other. The slider 31 of the shade switch piece 7 has movable contact points 18, 19, which function in the same manner as the contact points 18, 19 of the first embodiment. The contact points 18, 19 are each formed in an arcuate shape and arranged adjacent to each other. The base plate 27 has connecting portions 12, 13, 14, 15, which function in the same manner as the connecting portions 12, 13, 14, 15 of the first embodiment. The connecting portions 12, 13, 14, 15 are faced to the corresponding movable contact points 16, 17, 18, 19. In the present embodiment, although not illustrated, the connecting portions 12, 13, 14, 15 are arranged in an arcuate manner about the pivot axis 27a serving as the center of the radius of curvature and each located on the arcuate path of the corresponding movable contact point 16, 17, 18, 19.

The knob 28 of the glass switch piece 6 and the knob 29 of the shade switch piece 7 are reciprocally pivoted in a circumferential direction about the pivot axis 27a in correspondence with indicators each representing "close" or "open".

The illustrated embodiments have the advantages described below.

(1) In the first and second embodiments, when the shade switch piece 7 is moved to the second close position B2, the contact portions 10 allow the glass switch piece 6 to interlock with the shade switch piece 7 and move to the glass close position B. Therefore, the roof shade 23 is prevented from closing the opening 21 when the opening 21 is maintained in an open state by the roof glass 22. Accordingly, such a simple mechanical configuration prevents the roof glass 22 from being left open, and reliably closes the roof glass 22 when the roof shade 23 is closed.

(2) In the first and second embodiments, when the glass switch piece 6 is switched to the second open position C2, the contact portions 10 allow the shade switch piece 7 to interlink with the glass switch piece 6 to move to the shade open position C. Therefore, the roof glass 22 is prevented from moving to open the opening 21 when the opening 21 is closed by the roof shade 23. Accordingly, such a simple mechanical configuration prevents the roof shade 23 from being left closed and reliably opens the roof shade 23 when the roof glass 22 is opened.

(3) In the first and second embodiments, the simple mechanical configuration of the contact portions 10 of the glass switch piece 6 and the contact portions 10 of the shade switch piece 7 allow interlocking operation of the roof glass 22 and the roof shade 23.

(4) The technique described in Patent Document 3 employs a shade open switch, a slide-panel close switch, and a slide-panel open switch. Specifically, by manipulating the shade open switch when the opening is fully closed by the slide panel (which corresponds to the roof glass of the present application), the sun shade (which corresponds to the roof shade of the present application) is independently moved to open the opening. By manipulating the slide-panel close switch, the sun shade is independently moved to close the opening. By manipulating the slide-panel open switch, the slide panel and the sun shade are moved together to open the opening. When the slide panel is located at a position for opening the opening, the sun shade is prohibited from moving independently to close the opening. However, the technique of Patent Document 3 does not employ a close switch specifically designed for the sun shade. This makes it necessary to manipulate the slide-panel close switch to move the sun shade to close the opening, which causes discomfort for the user. Additionally, the directions in which the switches are manipulated do not correspond to the directions in which the slide panel and the sun shade are opened or closed. This easily causes erroneous manipulations.

In contrast, in the first and second embodiments of the present invention, the manipulating directions of the glass switch piece 6 and the shade switch piece 7 for closing the opening 21, which are the switching directions of the switch pieces 6 and 7 to the glass close position B or the first close position B1 or the second close position B2, correspond to the movement directions of the roof glass 22 and the roof shade 23 for closing the opening 21. Also, the manipulating directions of the glass switch piece 6 and the shade switch piece 7 for opening the opening 21, which are the switching directions of the switch pieces 6 and 7 to the first open position C1 or the second open position C2 or the shade open position C, correspond to the movement directions of the roof glass 22 and the roof shade 23 for opening the opening 21. As a result, the user is allowed to manipulate the glass switch piece 6 and the shade switch piece 7 with the same feeling as when the user selectively opens and closes the opening with the roof glass 22 and the roof shade 23. This facilitates switch manipulations by the user and prevents erroneous manipulations.

(5) In the first embodiment, the manipulating direction of the glass switch piece 6 and the manipulating direction of the shade switch piece 7 (which are the extending direction X of the attachment case 1) coincide with each other, thus allowing intuitive manipulations. This allows the glass switch piece 6 and the shade switch piece 7, which are aligned in the manipulating direction, to be held simultaneously, thus facilitating the switch manipulation.

(6) In the first embodiment, the sun roof is easily operated by linearly reciprocating the glass switch piece 6 and the shade switch piece 7. In the second embodiment, the sun roof is easily operated by reciprocally pivoting the glass switch piece 6 and the shade switch piece 7.

The illustrated embodiments may be modified in the following forms.

In the first and second embodiments, when the shade switch piece 7 is switched to the second close position B2, the glass switch piece 6 interlinks with the shade switch piece 7 and moves to the glass close position B. When the glass switch piece 6 is switched to the second open position C2, the shade switch piece 7 interlinks with the glass switch piece 6 and moves to the shade open position C. However, in a modified form, the shade switch piece 7 does not necessarily need to interlink with the glass switch piece 6 when the glass switch piece 6 is switched to the second open position C2.

In the first and second embodiments, the contact portions 10 of the glass switch piece 6 are spaced from the contact portions 10 of the shade switch piece 7. By causing the contact portions 10 to contact each other, the glass switch piece 6 and the shade switch piece 7 are allowed to interlink with each other. However, in a modified case, the glass switch piece 6 and the shade switch piece 7 each may have an engagement portion. The engagement portions are engaged with each other to allow interlocking operation of the glass switch piece 6 and the shade switch piece 7 and disengaged from each other to cancel such interlocking operation.

In the first and second embodiments, the movement directions of the roof glass 22 and the roof shade 23 for closing the opening 21 may be different from the switching directions of the glass switch piece 6 and the shade switch piece 7 to the glass close position B, the first close position B1, or the second close position B2. Also, the movement directions of the roof glass 22 and the roof shade 23 for opening the opening 21 may be different from the switching directions of the glass switch piece 6 and the shade switch piece 7 to the first open position C1, the second open position C2, or the shade open position C.

In the first embodiment, the manipulating directions of the glass switch piece 6 and the shade switch piece 7 to the glass close position B, the first close position B1, the second close position B2, the first open position C1, the second open position C2, or the shade open position C may be different from the alignment direction of the glass switch piece 6 and the shade switch piece 7.

In the first and second embodiments, the installment position of the switch device is not restricted to a position in the roof lower surface of the vehicle but may be a position in a floor console, for example.

In the pivotal switch device of the second embodiment, the shade switch piece 7 is located radially outward and the glass switch piece 6 is arranged radially inward to the shade switch piece 7. However, in a modified form, the glass switch piece may be arranged radially outward and the shade switch piece may be located radially inward to the glass switch piece.

The invention claimed is:

1. A switch device for a sunroof, comprising a glass switch piece and a shade switch piece that are manipulated to selectively open and close an opening in the sunroof with a roof glass and a roof shade, respectively, wherein
   the glass switch piece is switchable between a glass close position for closing the opening with the roof glass and a glass open position for opening the opening with the roof glass,
   the shade switch piece is switchable between a shade close position for closing the opening with the roof shade and a shade open position for opening the opening with the roof shade,
   the switch device includes an interlocking portion for causing the glass switch piece and the shade switch piece to operate in an interlocking manner,
   the shade close position of the shade switch piece includes a first close position, at which the interlocking portion prohibits the interlocking operation of the glass switch piece and the shade switch piece, and a second close position, at which the interlocking portion causes the glass switch piece and the shade switch piece to operate together in an interlocking manner,
   when the shade switch piece is moved to the first close position, the interlocking portion allows the shade switch piece to be independently manipulated and the roof shade closes the opening, and
   when the shade switch piece is moved to the second close position, the interlocking portion causing the glass switch piece to be operated together with the shade switch piece in an interlocking manner, thereby moving the glass switch piece to the glass close position so that the opening is closed with the roof shade and the roof glass, the glass close position of the glass switch piece includes a first open position, at which the interlocking portion prohibits the interlocking operation of the glass switch piece and the shade switch piece, and a second open position, at which the interlocking portion causes the glass switch piece and the shade switch piece to operate together in an interlocking manner, when the glass switch piece is moved to the first open position, the interlocking portion allows the glass switch piece to be operated independently and the roof glass opens the opening, and when the glass switch piece is moved to the second open position, the interlocking portion causes the shade switch piece to operate together with the glass switch piece in an interlocking manner to move the shade switch piece to the shade open position, so that the opening is opened with the roof glass and the roof shade.

2. The switch device according to claim 1, wherein the interlocking portion includes a contact portion arranged in the glass switch piece and a contact portion arranged in the shade switch piece, the glass switch piece and the shade switch piece are switchable together in an interlocking manner when the contact portion of the glass switch piece and the contact portion of the shade switch piece contact each other, and the glass switch piece and the shade switch piece are independently switchable when the contact portion of the glass switch piece and the contact portion of the shade switch piece are separated from each other.

3. The switch piece according to claim 1, wherein a direction in which the glass switch piece is switched to the glass close position and a direction in which the shade switch piece is switched to the shade close position coincide with a direction in which the roof glass and the roof shade are moved to close the opening, and a direction in which the glass switch piece is switched to the glass open position and a direction in which the shade switch piece is switched to the shade open position coincide with a direction in which the roof glass and the roof shade are moved to open the opening.

4. The switch device according to claim 1, wherein the glass switch piece and the shade switch piece are switchable in a common manipulating direction, and the glass switch piece and the shade switch piece are arranged in the manipulating direction.

5. The switch device according to claim 1, wherein the glass switch piece and the shade switch piece are both reciprocally movable in a linear manner.

6. The switch device according to claim 1, wherein the glass switch piece and the shade switch piece are each reciprocally pivotal.

* * * * *